(12) United States Patent
Shi et al.

(10) Patent No.: US 11,709,152 B2
(45) Date of Patent: Jul. 25, 2023

(54) LINKAGE DEVICE, TRANSCEIVER MODULE AND PLANE STRESS FIELD MEASURING DEVICE AND METHOD CAPABLE OF ACHIEVING SYNCHRONOUS ADJUSTMENT OF DISTANCE AND ANGLE

(71) Applicant: Harbin Institute of Technology, Harbin (CN)

(72) Inventors: Weijia Shi, Harbin (CN); Jiaxin Li, Harbin (CN); Bo Zhao, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 8 days.

(21) Appl. No.: 17/552,467

(22) Filed: Dec. 16, 2021

(65) Prior Publication Data

US 2023/0120241 A1 Apr. 20, 2023

(30) Foreign Application Priority Data

Oct. 20, 2021 (CN) .......................... 202111220083.1

(51) Int. Cl.
*G01N 29/26* (2006.01)
*G01B 17/00* (2006.01)
*G01N 29/07* (2006.01)

(52) U.S. Cl.
CPC .............. *G01N 29/26* (2013.01); *G01B 17/00* (2013.01); *G01N 29/07* (2013.01);
(Continued)

(58) Field of Classification Search
CPC ........ G01B 17/00; G01N 29/26; G01N 29/07; G01N 2291/011; G01N 2291/023;
(Continued)

(56) References Cited

U.S. PATENT DOCUMENTS 5,005,618 A * 4/1991 Stegherr ................... B27C 5/02
269/69
5,025,648 A * 6/1991 Matsuoka ............... B21F 35/02
72/134

(Continued)

*Primary Examiner* — Suman K Nath
(74) *Attorney, Agent, or Firm* — IPro, PLLC

(57) ABSTRACT

Disclosed are a linkage device, a transceiver module and a plane stress field measuring device and method capable of achieving synchronous adjustment of distance and angle, and relates to the field of ultrasonic non-destructive testing. The existing technical means for measuring plane stress in the field of ultrasonic testing has the shortcomings that the same testing is only applicable for single materials and the deflection angles of transmitting and receiving transducers are inconsistent. In the application, the linkage device designed by comprising a distance adjusting screw, an angle adjusting screw, a left connecting rod, a right connecting rod, a shaft column and a column lock is adopted, and based on the linkage device, the transceiver module designed by comprising a receiving end wedge, a receiving probe, a transmitting end wedge and a transmitting probe is additionally arranged; based on the transceiver module, the measuring device designed by comprising a pulse transmitting device, an amplifying device and a data acquisition device is additionally arranged, and the stress measuring method applicable for the stress measuring device is provided; and the distance and deflection angle between the receiving probe and the transmitting probe of the detection are adjusted according to a tested part. The application applies to stress measurement in the manufacturing process of mechanical components.

5 Claims, 2 Drawing Sheets

(52) U.S. Cl.
CPC .. *G01N 2291/011* (2013.01); *G01N 2291/023* (2013.01); *G01N 2291/02827* (2013.01); *G01N 2291/101* (2013.01)

(58) Field of Classification Search
CPC .... G01N 2291/02827; G01N 2291/101; Y02E 10/50; G01L 1/255; F16M 11/043; F16M 11/18
See application file for complete search history.

(56) References Cited

U.S. PATENT DOCUMENTS

| | | | |
|---|---|---|---|
| 5,737,990 A * | 4/1998 | Freeland | B27G 5/023 33/534 |
| 2010/0009318 A1* | 1/2010 | Kim | A61C 11/08 433/213 |

* cited by examiner

US 11,709,152 B2

LINKAGE DEVICE, TRANSCEIVER MODULE AND PLANE STRESS FIELD MEASURING DEVICE AND METHOD CAPABLE OF ACHIEVING SYNCHRONOUS ADJUSTMENT OF DISTANCE AND ANGLE

TECHNICAL FIELD

The disclosure herein relates to the field of ultrasonic non-destructive testing, in particular to a linkage device, a transceiver module and a plane stress field measuring device and method capable of achieving synchronous adjustment of distance and angle.

BACKGROUND

Stress formation is extremely common in the manufacturing and using process of mechanical components, and stress mainly represents residual stress and structural bearing capacity. Due to existence of these stresses, not only can the fatigue strength of workpieces be reduced, but also the technical defects of structure deformation and cracking under the action of cyclic loading may be caused; the damages may be aggravated in the using process and consequently the structural strength and stability are reduced greatly; and thus, it is of great significance to measure the stress of a key structure periodically. The internal stress of a measured object can be subjected to non-destructive testing based on the acoustoelastic effect of ultrasonic wave, and the stress sensitivity of critically refracted longitudinal wave to the propagation direction of the ultrasonic wave in various modes is highest; and a measuring device is simple, fast and high-precision in-service measurement of a plane stress field of the measured object can be achieved.

A device for measuring plane stress of anisotropic materials was disclosed in the patent CN201710154020.8 in 2017; a method is based on an anisotropic triadic method, and an octagonal ultrasonic oblique incident wedge is designed; six ultrasonic transducers are adopted to form three "pitch-catch" structural forms, but this method is only applicable for single material; if the materials are changed, the sound velocity will be changed, and accordingly an oblique incident device with different angles needs to be machined; and the measurement cost is increased. An ultrasonic measuring method for surface stress of composite materials was disclosed in the patent CN110231116A in 2019. An ultrasonic measuring device with a variable incident angle was designed in this method, and critically refracted longitudinal wave can be excited in different directions of the anisotropic composite materials through regulation of the deflection angle of the transducers; therefore, the application range of the measuring device is expanded greatly; however, the distance between the two transducers is fixed, and the measurement adaptability is lower during measurement of different materials or measurement in different directions of the composite materials; for the case that the velocity is higher, the distance between a transmitting probe and a receiving probe should be larger in order to effectively recognize the transit time difference; for the case that the sound velocity is lower, the distance between the transmitting probe and the receiving probe can be decreased, and the spatial resolution of stress measurement is improved. Meanwhile, the incident angle of a transmitting transducer and the receiving angle of a receiving transducer in this method need to be adjusted separately, which cannot be ensured that the deflection angles of the two transducers are consistent, and consequently the quality of signals received by the critically refracted longitudinal wave is affected; and the stress measurement sensitivity is reduced.

SUMMARY

The existing technical means for measuring plane stress in the field of ultrasonic testing has the shortcomings that the same testing is only applicable for single materials and the deflection angles of transmitting and receiving transducers are inconsistent. By aiming at the above problems, the scheme is adopted in the application:

A linkage device capable of achieving synchronous adjustment of distance and angle comprises a base, a distance adjusting screw 1, an angle adjusting screw 9, a left connecting rod 2, a right connecting rod 5, a shaft column 4 and a column lock 3; a screw rod of the distance adjusting screw 1 is fixedly connected with the base, and the shaft column 4 is cuboid; a long through hole is formed in the upper part of the shaft column, and a circular through hole is formed in the lower part of the shaft column; the opening directions of the long through hole and the circular through hole are perpendicular to each other, and the circular through hole in the lower part of the shaft column 4 is fixed to the middle position of the screw rod of the distance adjusting screw 1 in a sleeving mode; threads of threaded area, located on the both sides of the shaft column 4, of the screw rod are opposite, and the threaded areas of the both sides of the screw rod are each provided with a nut; the left connecting rod 2 and the right connecting rod 5 are of the same structure, and both are L-shaped plates, where one end is provided with long through hole; the left connecting rod 2 and the right connecting rod 5 are arranged symmetrically by taking the shaft column 4 as a central mirror, where the column lock 3 penetrates through the long through holes in the right connecting rod 5, the shaft column 4 and the left connecting rod 2, so that the right connecting rod, the shaft column and the left connecting rod are fixed; the bending positions of the left connecting rod 2 and the right connecting rod 5 are hinged to the base; the screw rod of the angle adjusting screw 9 is divided into two parts in the middle, and the threads of the two parts are opposite; and the two parts are each provided with a nut, and the two nuts are hinged to the tail ends of the other ends of the left connecting rod 2 and the right connecting rod 5 separately.

Furthermore, the device further comprises a distance adjusting handwheel and an angle adjusting handwheel 8; the distance adjusting handwheel is used for driving the distance adjusting screw 1 to rotate; and the angle adjusting handwheel 8 is used for driving the angle adjusting screw 9 to rotate.

A transceiver module of a plane stress field measuring device capable of achieving synchronous adjustment of distance and angle comprises linkage structures, a receiving end wedge 6, a receiving probe 7, a transmitting end wedge 11 and a transmitting probe 10; each linkage structure is the linkage device capable of achieving synchronous adjustment of distance and angle according to claim 1 or 2; the receiving end wedge 6 and the transmitting end wedge 11 are arranged on the base in a mirror symmetric mode, and fixedly connected with the two nuts of the distance adjusting screw 1 separately; the receiving probe 7 and the transmitting probe 10 are arranged in the mirror symmetric mode, and located on the receiving end wedge 6 and the transmitting end wedge 11 separately; the middle part of the receiving probe 7 is connected with the receiving end wedge 6 through a rotating shaft, and the middle part of the transmitting probe 10 is connected with the transmitting end wedge 11 through a rotating shaft; the tail ends of the receiving probe 7 and the transmitting probe 10 are connected with the two nuts on the angle adjusting screw 9 through rotating shafts separately; and the receiving probe 7 and the transmitting end of the transmitting probe 10 face the position below a bottom plate.

Furthermore, the probe parts of the transmitting probe 10 and the receiving probe 7 are concave.

A plane stress field measuring device capable of achieving synchronous adjustment of the distance and the angle comprises the transceiver module, a pulse transmitting device 12, an amplifying device 13 and a data acquisition device 14; the transceiver module is the transceiver module of the plane stress field measuring device capable of achieving synchronous adjustment of distance and angle according to claim 3; the pulse transmitting device 12 sends a pulse signal to the transmitting probe 10 in the transceiver module; the signal output from the receiving probe 7 in the transceiver module is sent to the data acquisition device 14 after being amplified through the amplifying device 13; and data interaction between the data acquisition device 14 and an external processing unit is achieved through a serial communication port.

A plane stress field measuring method capable of achieving synchronous adjustment of distance and angle comprises the steps of:

sending ultrasonic wave through the transmitting probe 10 to a part to be tested;

collecting the propagation velocity v of the ultrasonic wave in the part to be tested through the receiving probe 7;

determining the distance L between the receiving probe 7 and the transmitting probe 10;

collecting a first critical refraction angle when the ultrasonic wave is incident on the part;

collecting an LCR signal of the part;

collecting internal stress generated when a zero stress standard part is stretched;

collecting a rebound ultrasonic signal;

collecting the transit time difference between the collected rebound ultrasonic signal and the LCR signal;

conducting curve fitting through the transit time difference and the internal stress to obtain acoustic elastic coefficients $K_{11}$, $K_{22}$ and $K_{12}$ of the part in three directions; and collecting a plane stress field at the measuring position when the propagation angles of the ultrasonic wave are 0 degree, 45 degrees and 90 degrees.

Furthermore, the range of the determined distance L is:
L needs to meet the following formula:

$$\frac{L}{v_1} - \frac{L}{v} \geq t_0$$

where, v represents the propagation velocity of the ultrasonic wave in the measured materials without stress, $v_1$ represents the propagation velocity of the ultrasonic wave in the tested materials with stress, and t represents the temporal resolution of a single-channel high-speed data acquisition device 14.

Furthermore, the step of collecting a first critical refraction angle when the ultrasonic wave is incident on the part from the wedge is specifically shown;

$$\varphi = \arcsin\left(\frac{v_2}{v_3}\right)$$

where, φ represents the first critical refraction angle of the ultrasonic wave when the ultrasonic wave is incident on the part from the wedge, $v_2$ represents the propagation velocity of the ultrasonic wave in the wedge, and $v_3$ represents the propagation velocity of the ultrasonic wave in the part.

Furthermore, the step of collecting the plane stress field at the measuring position is specifically shown:

In the following formula:

$$\Delta t_\theta = K11\left(\frac{\sigma_{11}+\sigma_{22}}{2} + \frac{\sigma_{11}-\sigma_{22}}{2}\cos2\theta + \sin2\theta\sigma_{12}\right) + $$
$$K22\left(\frac{\sigma_{11}+\sigma_{22}}{2} - \frac{\sigma_{11}-\sigma_{22}}{2}\cos2\theta - \sin2\theta\sigma_{12}\right) + $$
$$K11\left(-\frac{\sigma_{11}-\sigma_{22}}{2}\sin2\theta + \cos2\theta\sigma_{12}\right)$$

where, $\Delta t_\theta$ represents the transit time difference between stress propagation and stress-free propagation of the ultrasonic wave propagating by an angle ϑ relative to a global coordinate system, $\sigma_{11}$ represents principal stress in the x direction, $\sigma_{22}$ represents principal stress in the y direction, and $\sigma_{12}$ represents shear stress in the xy direction.

A computer equipment comprises a memory and a processor; computer programs are stored in the memory; when the processor runs the computer programs stored in the memory, the processor executes the plane stress field measuring method capable of achieving synchronous adjustment of the distance and the angle according to claim 6.

The application has the beneficial effects that:

For in-service plane stress field measurement requirements, disclosed is a critical refraction plane stress field measuring device and method with adjustable distance and synchronously adjustable deflection angles of ultrasonic transducers; on the basis of an existing mechanical structure scheme, linkage structures of the receiving probe and the transmitting probe, and a threaded screw structure are introduced creatively; through cooperation of the linkage structures and the threaded screw structure, the synchronous adjustment of the deflection angles of the transmitting probe and the receiving probe is achieved; meanwhile, the threaded screw structure is additionally arranged, and used for connecting wedges at the two ends of the receiving probe and the transmitting probe; accurate adjustment of the propagation distance between the receiving probe and the transmitting probe can be further achieved; through improvement of the mechanical structure, the application range of the device is expanded greatly, and meanwhile by using a multi-angle measurement scheme, the accurate measurement of the plane stress field of the measured object can be achieved.

The linkage device capable of achieving synchronous adjustment of the distance and the angle provided by the application has the beneficial effects that:

The device capable of achieving adjustment of the distance between the receiving probe and the transmitting probe and synchronous adjustment of the deflection angles of the receiving probe and the transmitting probe is designed, and through rotation of the distance adjusting screw structure, the function of adjusting the propagation distance of the critically refracted longitudinal wave between the receiving probe and the transmitting probe is achieved; the problem that a single measuring device in the prior art only aims at a measured material and the distance between and the deflection angles of the receiving probe and the transmitting probe in the measuring device cannot be adjusted according to the parameters of the measured material is solved; and the purpose that the measurement of various measured materials can be achieved through one measuring device is achieved. The measurement cost is reduced through the device, and the testing process is simpler and faster.

The plane stress field measuring method and device capable of achieving synchronous adjustment of the distance and the angle provided by the application has the beneficial effects that:

According to the measuring method and device provided by the disclosure, the linkage device capable of achieving synchronous adjustment of the distance and the angle is additionally arranged, and the propagation distance of the critically refracted longitudinal wave can be adjusted in real time according to the longitudinal wave velocity and stress measurement resolution of the measured object, which is ensured that different measured objects have optimal spatial resolutions; the problem that the spatial resolution of a traditional stress measuring device for the measured object made of different materials is fixed is solved; through the angle synchronous adjusting screw structure, the problems that the angle adjustment of the receiving probe and the transmitting probe is complex and separate adjustment is inconsistent can be solved; and it is ensured that the optimal critically refracted longitudinal wave signal can be obtained at the receiving end.

The disclosure applies to stress measurement application in the manufacturing process of mechanical components.

1 is distance adjusting screw, 2 is left connecting rod, 3 is column lock, 4 is shaft column, 5 is right connecting rod, 6 is receiving end wedge, 7 is receiving probe, 8 is angle adjusting handwheel, 9 is angle adjusting screw, 10 is transmitting probe, 11 is transmitting end wedge, 12 is pulse transmitting device, 13 is amplifying device, and 14 is data acquisition device.

DETAILED DESCRIPTION

Figure 1:
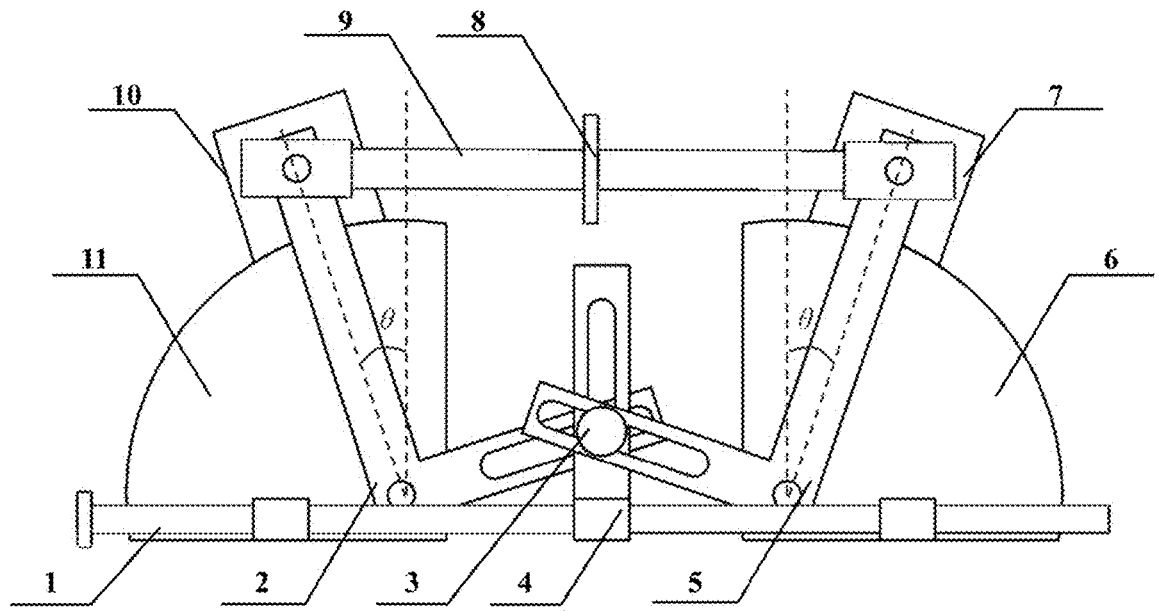
FIG. 1 is a schematic diagram of a linkage device capable of achieving synchronous adjustment of distance and angle, installed on an applicable measuring device and provided by the application.

The description of the application is given below by referring to the figures:

Example I, the description of this example is given by referring to FIG. 1; the example provides a linkage device capable of achieving synchronous adjustment of distance and angle, and the device comprises a base, a distance adjusting screw 1, an angle adjusting screw 9, a left connecting rod 2, a right connecting rod 5, a shaft column 4 and a column lock 3; a screw rod of the distance adjusting screw 1 is fixedly connected with the base, and the shaft column 4 is cuboid; a long through hole is formed in the upper part of the shaft column, and a circular through hole is formed in the lower part of the shaft column; the opening directions of the long through hole and the circular through hole are perpendicular to each other, and the circular through hole in the lower part of the shaft column 4 is fixed to the middle position of the screw rod of the distance adjusting screw 1 in a sleeving mode; threads of threaded area, located on the both sides of the shaft column 4, of the screw rod are opposite, and the threaded areas of the both sides of the screw rod are each provided with a nut; the left connecting rod 2 and the right connecting rod 5 are of the same structure, and both are L-shaped plates, where one end is provided with long through hole; the left connecting rod 2 and the right connecting rod 5 are arranged symmetrically by taking the shaft column 4 as a central mirror, where the column lock 3 penetrates through the long through holes in the right connecting rod 5, the shaft column 4 and the left connecting rod 2 in sequence, so that the right connecting rod, the shaft column and the left connecting rod are fixed; the bending positions of the left connecting rod 2 and the right connecting rod 5 are hinged to the base; the screw rod of the angle adjusting screw 9 is divided into two parts in the middle, and the threads of the two parts are opposite; and the two parts are each provided with a nut, and the two nuts are hinged to the tail ends of the other ends of the left connecting rod 2 and the right connecting rod 5 separately.

Example II, the description of this example is given by referring to FIG. 1; the example is for the purpose of further limitation to the linkage device capable of achieving synchronous adjustment of distance and angle provided by the example I, and the device further comprises a distance adjusting handwheel and an angle adjusting handwheel 8; the distance adjusting handwheel is used for driving the distance adjusting screw 1 to rotate; and the angle adjusting handwheel 8 is used for driving the angle adjusting screw 9 to rotate.

Example III, the description of this example is given by referring to FIG. 1; the example provides a transceiver module of a plane stress field measuring device capable of achieving synchronous adjustment of distance and angle, and the module comprises a linkage structure, a receiving end wedge 6, a receiving probe 7, a transmitting end wedge 11 and a transmitting probe 10; the linkage structure is the linkage device capable of achieving synchronous adjustment of distance and angle according to claim 1 or 2; the receiving end wedge 6 and the transmitting end wedge 11 are arranged on the base in a mirror symmetric mode, and fixedly connected with the two nuts of the distance adjusting screw 1 separately; the receiving probe 7 and the transmitting probe 10 are arranged in the mirror symmetric mode, and located on the receiving end wedge 6 and the transmitting end wedge 11 separately; the middle part of the receiving probe 7 is connected with the receiving end wedge 6 through a rotating shaft, and the middle part of the transmitting probe 10 is connected with the transmitting end wedge 11 through a rotating shaft; the tail ends of the receiving probe 7 and the transmitting probe 10 are connected with the two nuts on the angle adjusting screw 9 through rotating shafts separately; and the receiving probe 7 and the transmitting end of the transmitting probe 10 face the position below a bottom plate.

Example IV, the description of this example is given by referring to FIG. 1; the example is for the purpose of further limitation to the transceiver module of the plane stress field measuring device capable of achieving synchronous adjustment of distance and angle provided by the example III, and the probe parts of the transmitting probe 10 and the receiving probe 7 are concave.

Figure 2:
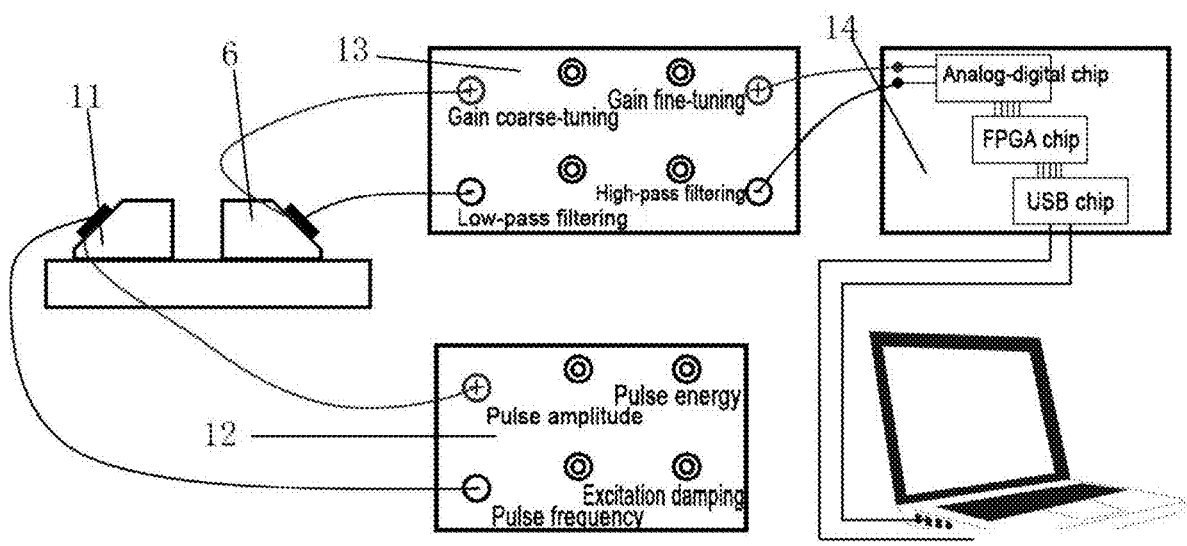
FIG. 2 is a schematic diagram of a plane stress field measuring device capable of achieving synchronous adjustment of distance and angle, provided by the application.

Example V, the description of this example is given by referring to FIG. 2; the example provides a plane stress field measuring device capable of achieving synchronous adjustment of distance and angle, and the device comprises the transceiver module, a pulse transmitting device 12, an amplifying device 13 and a data acquisition device 14; the transceiver module is the transceiver module of the plane stress field measuring device capable of achieving synchronous adjustment of distance and angle according to Claim 3; the pulse transmitting device 12 sends a pulse signal to the transmitting probe 10 in the transceiver module; the signal output from the receiving probe 7 in the transceiver module is sent to the data acquisition device 14 after being amplified through the amplifying device 13; and data interaction between the data acquisition device 14 and an external processing unit is achieved through a serial communication port.

Specifically:

The output signal of a high-frequency and high-pressure sharp negative-edged pulse transmitting device 12 is connected with an ultrasonic transmitting probe, and the ultrasonic wave corresponding to the center frequency of the transmitting probe 10 is excited; when the incident angle of the ultrasonic wave is set according to the wedge and the longitudinal wave velocity of the measured material and meets the first critical refraction law, the critically refracted longitudinal wave is generated in the measured object; the angles of the transmitting probe 10 and the receiving probe 7 are synchronously adjusted through the angle adjusting screw and the linkage structure between the transmitting probe and the receiving probe, and it can be accurately ensured that the deflection angles of the transmitting probe and the receiving probe are identical; at the moment, the quality of the signal that the receiving probe 7 obtains is optimal, and the amplitude of the signal output from the receiving probe 7 is generally a few millivolts or below; thus, the signal of the receiving probe 7 is connected to a high bandwidth receiving and amplifying device 13, and subjected to primary simulation amplification; meanwhile, a low pass filter ad a high pass filter are set according to the frequency range of a target signal, and used for filtering spurious noise from the signal; the pre-treated signal is connected to a single-channel high-speed data acquisition device 14, and converted into a digital signal through an analog-digital converter; then, under the control of a main control chip FPGA, the data is transmitted to a PC for processing through a USB3.0 communication mode in real time, and the PC can store the signal for off-line processing or process the signal on line.

Example VI, the example provides a plane stress field measuring method capable of achieving synchronous adjustment of distance and angle, and the method comprises the steps of:

sending ultrasonic wave through the transmitting probe 10 to a part to be tested;

collecting the propagation velocity v of the ultrasonic wave in the part to be tested through the receiving probe 7;

determining the distance L between the receiving probe 7 and the transmitting probe 10;

collecting a first critical refraction angle when the ultrasonic wave is incident on the part;

collecting an LCR signal of the part;

collecting internal stress generated when a zero stress standard part is stretched;

collecting a rebound ultrasonic signal;

collecting the transit time difference between the collected rebound ultrasonic signal and the LCR signal;

conducting curve fitting through the transit time difference and the internal stress to obtain acoustic elastic coefficients $K_{11}$, $K_{22}$ and $K_{12}$ of the part in three directions; and collecting a plane stress field at the measuring position when the propagation angles of the ultrasonic wave are 0 degree, 45 degrees and 90 degrees.

Specifically, in this example, the part needs to be subjected to thermal-cold cycling aging treatment and vibration aging repeated treatment to obtain and test the zero stress standard part.

Example VII, the example is for the purpose of further limitation to the plane stress field measuring method capable of achieving synchronous adjustment of distance and angle provided by the example VI, and the range of the determined distance L is that:

L needs to meet the following formula:

$$\frac{L}{v_1} - \frac{L}{v} \geq t_0$$

v represents the propagation velocity of the ultrasonic wave in tested materials without stress, $v_1$ represents the propagation velocity of the ultrasonic wave in the measured materials with stress, and t represents the temporal resolution of a single-channel high-speed data acquisition device 14.

After the part is processed, the residual stress in the measured object is eliminated through thermal-cold cycling aging treatment and vibration aging repeated treatment, and at the moment the measured object can be considered as the zero stress standard part.

Example VIII, the example is for the purpose of further limitation to the plane stress field measuring method capable of achieving synchronous adjustment of distance and angle provided by Example VI, and the step of collecting a first critical refraction angle when the ultrasonic wave is incident on the part from the wedge is specifically shown:

$$\varphi = \arcsin\left(\frac{v_2}{v_3}\right)$$

where, φ represents the first critical refraction angle of the ultrasonic wave when the ultrasonic wave is incident on the part from the wedge, $v_2$ represents the propagation velocity of the ultrasonic wave in the wedge, and $v_3$ represents the propagation velocity of the ultrasonic wave in the part.

The approximate distance between the receiving probe and the transmitting probe can be calculated through a formula $$\frac{L}{v_1} - \frac{L}{v} \geq t_0$$

according to the approximate relation between the ultrasonic wave velocity and the stress and the stress measurement resolution, and then the receiving probe and the transmitting probe are accurately located through a distance adjusting mechanism. After the distance between the receiving probe and the transmitting probe is set, the deflection angles of the receiving probe and the transmitting probe are set; when the ultrasonic wave is propagated to another material through a boundary surface, mode transition occurs, namely that when the incident wave is the longitudinal wave, the refracted wave includes the longitudinal wave and the transverse wave; the propagation velocity of the longitudinal wave is high, and the vibration direction of the longitudinal wave is consistent with the propagation direction; the stress sensitivity of the longitudinal wave to the propagation direction of the longitudinal wave is maximum, and therefore the first critical refraction angle of the ultrasonic wave which is incident on the measured object from the wedge is calculated according to the Snell law.

Example IX, the example is for the purpose of further limitation to the plane stress field measuring method capable of achieving synchronous adjustment of distance and angle provided by the example VI, and the step of collecting the plane stress field at the measuring position is specifically shown:

In the following formula:

$$\Delta t_\theta = K11\left(\frac{\sigma_{11}+\sigma_{22}}{2} + \frac{\sigma_{11}-\sigma_{22}}{2}\cos 2\theta + \sin 2\theta \sigma_{12}\right) +$$
$$K22\left(\frac{\sigma_{11}+\sigma_{22}}{2} - \frac{\sigma_{11}-\sigma_{22}}{2}\cos 2\theta - \sin 2\theta \sigma_{12}\right) +$$
$$K11\left(-\frac{\sigma_{11}-\sigma_{22}}{2}\sin 2\theta + \cos 2\theta \sigma_{12}\right)$$

where, $\Delta t_\theta$ represents the transit time difference between stress propagation and stress-free propagation of the ultrasonic wave propagating by an angle $\theta$ relative to a global coordinate system, $\sigma_{11}$ represents principal stress in the x direction, $\sigma_{22}$ represents principal stress in the y direction, and $\sigma_{12}$ represents shear stress in the xy direction.

The angles of the two probes are adjusted to the deflection angles calculated according to the formula provided in Example VIII through the angle synchronous adjusting mechanism. After completion of the above basic setting, the collection of the LCR signal of the zero stress standard part is started as a reference signal. If two plane principal stresses and a plane shear stress are obtained through a measurement, three equations should be used for solving three unknowns, so that the angles $\theta$ of the propagation direction of the ultrasonic wave relative to the global coordinate system are set to 0 degree, 45 degrees and 90 degrees, and the stress-free reference data are measured under the three conditions.

The external force is applied to the measured objected through a extensograph, and therefore a uniform stress field is generated in the measured object; in order to ensure the calibration accuracy of the acoustoelastic coefficient, different tensile conditions are set for multiple measurements; for example, the stress is applied only in the x direction; the stress is applied only in the y direction, and meanwhile the stress is applied in the x direction and the y direction, so that a measured signal is obtained; then, the transit time difference of the measured signal relative to the reference signal is calculated through a cross-correlation algorithm, and the curve fitting is conducted for the internal stress generated by tension and the transit time difference to obtain the acoustoelastic coefficients of the measured object in the three direction, and are respectively $K_{11}$, $K_{22}$ and $K_{12}$. Since the acoustoelastic coefficients are constant values, the results obtained through multiple measurements are averaged, and the accuracy of the calibration results can be improved.

According to the formula provided in the example, when the propagation angle $\vartheta$ of the ultrasonic wave is set to 0 degree, 45 degrees and 90 degrees during actual measurement, three equations related to the plane stress are obtained, and the three equations are combined so that the plane stress filed of the measuring position can be determined.

Example X, this example provides computer equipment comprising a memory and a processor; computer programs are stored in the memory; when the processor runs the computer programs stored in the memory, the processor executes the plane stress field measuring method capable of achieving synchronous adjustment of distance and angle according to claim 6.

Figure 3:
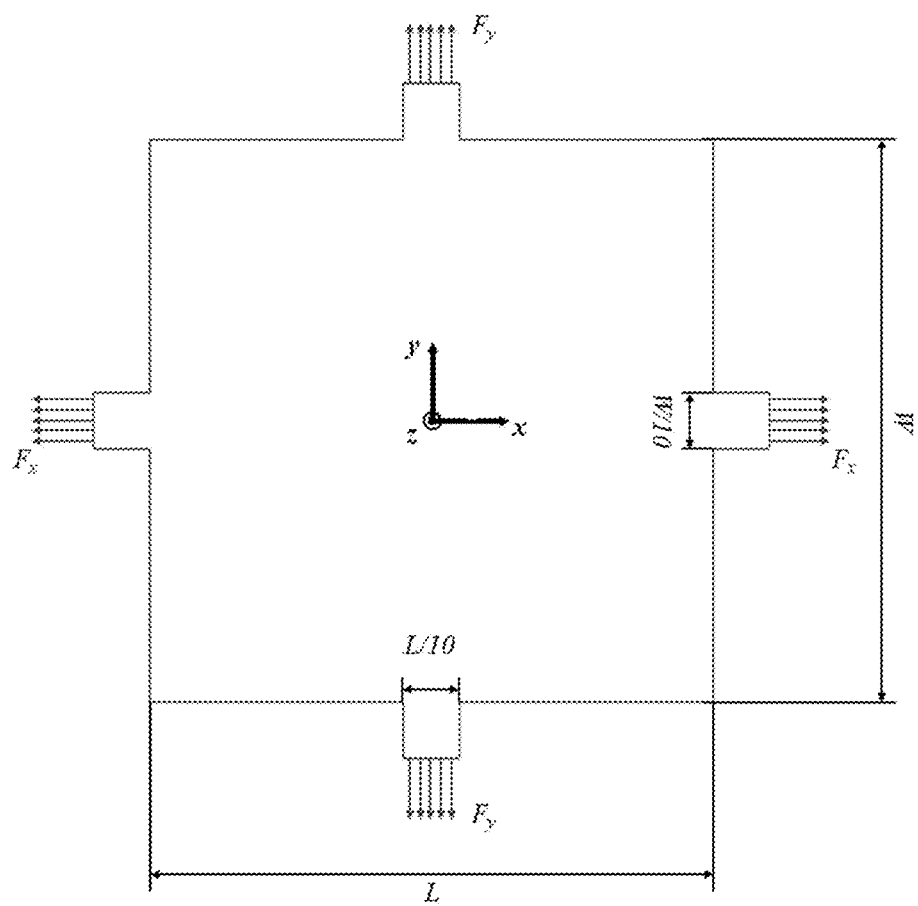
FIG. 3 is a schematic diagram of a zero stress standard part stated in the example; where, W is the length of the standard part in the y-axis direction, L is the length of the standard part in the x-axis direction, $F_x$ represents the force applied by a extensograph in the x direction, and $F_y$ represents the force applied by the extensograph in the y direction.

Example XI, the description of this example is given by referring to FIG. 3; the example is specifically provided for the plane stress field measuring method capable of achieving synchronous adjustment of distance and angle provided by the application.

Firstly, key components of the measuring device are arranged according to the target deflection angle range of the measuring device and the range of the distance between the receiving probe and the transmitting probe, and a proper concave transducer is selected according to the radius of an arc-shaped wedge used in the device; by using the focusing performance of the concave transducer, the critically refracted longitudinal wave emission energy is improved, and therefore the signal-to-noise ratio of receiving transducer signal is effectively ensured; the receiving and transmitting transducers are assembled with variable angle and distance devices.

Then, an ultrasonic pulse transceiver system is integrated, and a sharp negative-edged pulse is emitted through the single-channel high-frequency and high-voltage pulse device; the transmitting probe 10 is excited to generate the critically refracted longitudinal wave within the object tested, and the probe of a receiving channel is connected with the high bandwidth receiving and amplifying device 13; after primary simulation amplification and filtration, the receiving signal is collected through the single-channel high-speed data acquisition device 14, and the collected signal is sent to the PC for data processing through a PCIE bus in real time.

Finally, the acoustoelastic coefficients of the two plane principal stresses and a plane shear stress are calibrated separately through a biaxial tension test, and the plane stress measurement of the measured object is completed according to change in transit time difference between the measured signal and the reference signal during actual measurement.

Specifically:

The propagation velocity of the ultrasonic longitudinal wave in an organic glass wedge is 2730 m/s at normal temperature; the measured object is an aluminum plate, and made of isotropic materials; the propagation velocity of the longitudinal wave in the measured object is 6300 m/s, and 100 MPa stress causes the propagation velocity of the ultrasonic wave to change by 1%; the temporal resolution of the high-speed data acquisition device 14 used in the system is 1 ns, and the stress measurement resolution is 5 MPa; the minimum propagation distance between the receiving probe and the transmitting probe can be calculated according to the formula provided in Example VII, and is about 12.6 mm; the distance adjusting screw is adjusted by a full turn in order to facilitate use, and therefore the screw pitch of the distance adjusting screw is machined to 0.1 mm; and thus, it is ensured that the propagation distance between the receiving probe and the transmitting probe is 12.6 mm through adjustment of the thread screw structure. Then, the first critical refraction angle of the ultrasonic wave is 25.68 degrees, calculated according to the formula provided in Example VIII; the angle synchronous adjusting screw and the distance adjusting screw 1 have the same screw pitch in order to reduce the machining cost, and the angle synchronous adjusting screw can be adjusted by ⅓ turn each time; the arm length of the linkage structures of the receiving probe and the transmitting probe is 20 mm, and then the minimum adjustable angle of the structure can be 0.095 degree; in this angle range, the deflection angles of the receiving probe and the transmitting probe can be basically considered highly consistent, and therefore the optimal critically refracted longitudinal wave signal can be obtained at the receiving end.

The high-frequency and high-pressure sharp negative-edged pulse transmitting device 12, the transmitting probe 10, the receiving probe 7, the high bandwidth receiving and amplifying device 13 and the high-speed data acquisition device 14 are connected according to the mode in the technical scheme, and the pulse repetition frequency of the pulse transmitting device 12 is set to 100 Hz; the ultrasonic wave signals are collected for 10 times generally; and then, the collected signals are smoothly filtered, and the Gaussian white noise in the signals are reduced.

A standard tension part as shown in the figure is made of the materials in actual measurement, and subjected to corresponding zero stress treatment; firstly, the signals in different propagation directions of the zero stress standard part are collected and stored as reference signals, and then the zero stress standard part is stepwise stretched through the extensograph; three stretching conditions are set, and the first condition is stretching in the x direction; the second condition is stretching in the y direction; the third condition is stretching in the x direction and the y direction simultaneously, and under each stretching condition, three propagation angles of the ultrasonic wave are measured for the standard part, and are respectively 0 degree, 45 degrees and 90 degrees relative to the global coordinate axis; the acoustoelastic constants of the measured materials are calculated according to the result measured each time; and then, the results of multiple measures are averaged to obtain the finally calibrated acoustoelastic constants $K_{11}$, $K_{22}$ and $K_{12}$. Finally, during measurement of the measured object, the propagation transit time difference between the measured object and the zero stress standard part under the condition of propagation in three directions; then, the three equations in Example IX are established, and combined to determine the plane stress field of the measuring position.

According to the measuring device capable of achieving synchronous adjustment of the distance and the angle, the optimal spatial resolutions of different measured objects are ensured effectively, and meanwhile the problems of complex adjustment of the transmitting and receiving angles of the ultrasonic probes and inconsistent angles are solved; the application range of the measuring device is widened effectively, and a multi-angle plane stress field measuring method is established; and the plane stress field of the measured object can be completely obtained through combination of the three equations.

Example XII, the description of this example is given by referring to FIG. 1, and the example provides a mounting method and steps of the linkage device capable of achieving synchronous adjustment of the distance and the angle, provided by the disclosure, specifically:

The dimension parameters of the key components of the measuring device are designed according to the deflection angle range and the range of the distance between the transmitting probe and the receiving probe, and then the geometric machining accuracy of the key components are determined according to the adjustment accuracy of the angle and the distance. During assembly of the components, firstly, the column lock 3 is installed on the base, and the distance adjusting screw 1 penetrates through the column lock 3; the transmitting end wedge 11 at the transmitting end and the receiving end wedge 6 at the receiving end are connected through the structure of the distance adjusting screw 1; right-hand threads are machined at the screw position where the transmitting end wedge 11 is located, and then the receiving end wedge 6 at the position of the screw is rotated in reversed direction; it is ensured that the transmitting end wedge 11 and the receiving end wedge 6 are moved in two different directions, and the relative movement distances of the two wedges are the same; after the above steps are confirmed, the linkage structures are installed continuously, and each linkage structure comprises the left connecting rod 2, the right connecting rod 5, the shaft column 4 and the column lock 3; it is ensured that the linkage structures are in the fixed state, and the linkage structures on the right and left sides are in the free rotating state; after it is determined that no mechanical interference exists in the above structures, the linkage structures on the right and left sides are rotated synchronously through up-and-down movement of the column lock 3; next, the transmitting probe 7 and the receiving probe 10 are installed, and finally it is ensured that the transmitting probe and the receiving probe are connected in series through the angle adjusting screw 9; similarly, the right-hand threads are machined at the screw position where the transmitting probe 10 is located, and the reversed threads are machined at the screw position where the receiving probe 7 is located; the screws are moved in one direction through the handwheel 8, and it is ensured that the transmitting probe and the receiving probe are moved in the two directions; and after the relative deflection angles are consistent, the current wedge position and the probe position can be locked, and the installation and adjustment of the measuring device are completed.

Example XIII, the description of this example is given by referring to FIG. 1, and the example provides an adjusting method and steps of the linkage device capable of achieving synchronous adjustment of the distance and the angle, provided by the application, specifically:

The device has the main advantages that the ultrasonic stress measuring device capable of adjustment of the distance between the transmitting probe and the receiving probe and the synchronous adjustment of the deflection angle of the receiving probe and the transmitting probe is designed, and the propagation distance, of the critically refracted longitudinal wave between the receiving probe and the transmitting probe is adjustable through the distance adjusting screw structure; the distance adjustment range depends on the linage structures of the receiving probe and the transmitting probe and the lengths of the distance adjusting screw 1, and can be designed according to the requirements during actual measurement; the distance adjustment accuracy depends on the machining accuracy and the rotation angle accuracy of the thread screws; provided that the screw pitch of the thread screws is L and the minimum rotation angle of the screws is φ, the distance step of the distance adjusting mechanism is:

$$\Delta L = L\phi/2\pi$$

The propagation distance of the critically refracted longitudinal wave can be adjusted in real time according to the longitudinal wave velocity and stress measurement resolution φ of the measured object; it is ensured that different measured objects have optimal spatial resolutions; the problem that the spatial resolution of a traditional stress measuring device for the measured object made of different materials is fixed is solved; through the angle synchronous adjusting screw structure, the problems that the angle adjustment of the receiving probe and the transmitting probe is complex and separate adjustment is inconsistent can be solved; and it is ensured that the optimal critically refracted longitudinal wave signal can be obtained at the receiving end. The angle adjustment accuracy of the receiving probe and the transmitting probe depends on the distance between the screws, the rotation angles of the screws and the arm length of the linkage structures of the receiving probe and the transmitting probe; provided that the screw pitch of the thread screws is L, the minimum rotation angle of the screws is φ and the arm length of the linkage structure is D, the step of the angle adjusting mechanism is:

$$\Delta\theta = L\ \phi/(D\times 2\pi)$$

Through design of the key parameters of the above structures, it can be ensured that the deflection angles of the receiving probe and the transmitting probe are adjusted accurately, and the consistency of the deflection angles of the two probes is improved greatly. The application range of ultrasonic wave in-service measurement is improved greatly on the basis of the two improvements. Meanwhile, through measurement of the transit time difference of multi-angle propagation directions, the plane stress measuring method is established, and the system of linear simultaneous equations in three unknowns is set by using the relation between the propagation transit time difference of the ultrasonic wave in three directions and the stresses in three directions separately; and the equations are combined so that the plane stress field of the measuring position can be obtained. Subsequently, it can be considered that the existing measuring device is integrated with a mechanical arm with six degrees of freedom, and meanwhile a linear array CCD sensor can be installed on the mechanical arm; the three-dimensional contour information of the measured object can be determined through the CCD sensor, and then a scanning scheme is formulated; and the automatic scanning of the ultrasonic plane stress field aided by the mechanical arm is achieved finally.

The detailed description of the device is given above by examples, but the above mentioned content is only the preferable embodiments, and is not intended to be limiting; and any modification, combination of embodiments, equivalent replacement and improvement, etc. made according to the spirit and principles of the application shall be included in the protection scope of the application.

What is claimed is:

1. A linkage device capable of achieving synchronous adjustment of distance and angle, wherein the device comprises a base, a distance adjusting screw (1), an angle adjusting screw (9), a left connecting rod (2), a right connecting rod (5), a shaft column (4) and a column lock (3); a screw rod of the distance adjusting screw (1) is fixedly connected with the base, and the shaft column (4) is cuboid; a long through hole is formed in the upper part of the shaft column, and a circular through hole is formed in the lower part of the shaft column; the opening directions of the long through hole and the circular through hole are perpendicular to each other, and the circular through hole in the lower part of the shaft column (4) is fixed to the middle position of the screw rod of the distance adjusting screw (1) in a sleeving mode; threads of threaded area, located on both sides of the shaft column (4), of the screw rod are opposite, and the threaded areas of both sides of the screw rod are each provided with a nut; the left connecting rod (2) and the right connecting rod (5) are of the same structure, and both are L-shaped plates, wherein one end is provided with long through hole; the left connecting rod (2) and the right connecting rod (5) are arranged symmetrically by taking the shaft column (4) as a central mirror, wherein the column lock (3) penetrates through the long through holes in the right connecting rod (5), the shaft column (4) and the left connecting rod (2) in sequence, so that the right connecting rod, the shaft column and the left connecting rod are fixed; the bending positions of the left connecting rod (2) and the right connecting rod (5) are hinged to the base; the screw rod of the angle adjusting screw (9) is divided into two parts in the middle, and the threads of the two parts are opposite; and the two parts are each provided with a nut, and the two nuts are hinged to the tail ends of the other ends of the left connecting rod (2) and the right connecting rod (5) separately.

2. The linkage device capable of achieving synchronous adjustment of distance and angle according to claim 1, wherein the device further comprises a distance adjusting handwheel and an angle adjusting handwheel (8); the distance adjusting handwheel is used for driving the distance adjusting screw (1) to rotate; and the angle adjusting handwheel (8) is used for driving the angle adjusting screw (9) to rotate.

3. A transceiver module of a plane stress field measuring device capable of achieving synchronous adjustment of distance and angle, comprising the linage device of claim 1, wherein the transceiver module further comprises a receiving end wedge (6), a receiving probe (7), a transmitting end wedge (11) and a transmitting probe (10); the linkage device is capable of achieving synchronous adjustment of distance and angle; the receiving end wedge (6) and the transmitting end wedge (11) are arranged on the base in a mirror symmetric mode, and fixedly connected with the two nuts of the distance adjusting screw (1) separately; the receiving probe (7) and the transmitting probe (10) are arranged in the mirror symmetric mode, and located on the receiving end wedge (6) and the transmitting end wedge (11) separately; the middle part of the receiving probe (7) is connected with the receiving end wedge (6) through a rotating shaft, and the middle part of the transmitting probe (10) is connected with the transmitting end wedge (11) through a rotating shaft; the tail ends of the receiving probe (7) and the transmitting probe (10) are connected with the two nuts on the angle adjusting screw (9) through rotating shafts separately; and the receiving probe (7) and the transmitting end of the transmitting probe (10) face the position below a bottom plate.

4. The transceiver module of the plane stress field measuring device capable of achieving synchronous adjustment of distance and angle according to claim 3, wherein the probe parts of the transmitting probe (10) and the receiving probe (7) are concave.

5. A plane stress field measuring device capable of achieving synchronous adjustment of distance and angle, comprising the transceiver module of claim 3, a pulse transmitting device (12), an amplifying device (13) and a data acquisition device (14); the pulse transmitting device (12) sends a pulse signal to the transmitting probe (10) in the transceiver module; the signal output from the receiving probe (7) in the transceiver module is sent to the data acquisition device (14) after being amplified through the amplifying device (13); and data interaction between the data acquisition device (14) and an external processing unit is achieved through a serial communication port.

* * * * *